US008400636B2

(12) United States Patent
Smith et al.

(10) Patent No.: US 8,400,636 B2
(45) Date of Patent: Mar. 19, 2013

(54) BLAST INJURY DOSIMETER

(75) Inventors: Douglas H. Smith, Garnet Valley, PA (US); Shu Yang, Blue Bell, PA (US); D. Kacy Cullen, Philadelphia, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 853 days.

(21) Appl. No.: 12/383,777

(22) Filed: Mar. 27, 2009

(65) Prior Publication Data

US 2010/0073678 A1 Mar. 25, 2010

Related U.S. Application Data

(60) Provisional application No. 61/072,045, filed on Mar. 27, 2008.

(51) Int. Cl.
*G01J 3/46* (2006.01)
*G01B 11/30* (2006.01)
(52) U.S. Cl. .................. 356/402; 356/600; 356/601
(58) Field of Classification Search .................. 356/402, 356/600, 601
See application file for complete search history.

(56) References Cited

U.S. PATENT DOCUMENTS

| 931,348 | A | * | 8/1909 | Schulz | 73/35.14 |
| 1,344,722 | A | * | 6/1920 | Schulz | 73/35.14 |
| 2,519,421 | A | * | 8/1950 | Weiss | 73/35.16 |
| 4,492,121 | A | * | 1/1985 | Lehto | 73/705 |
| 4,805,461 | A | * | 2/1989 | Gupta et al. | 73/800 |
| 4,991,150 | A | * | 2/1991 | Wixom | 367/140 |
| 5,315,364 | A | * | 5/1994 | Arion et al. | 356/32 |
| 6,660,994 | B1 | * | 12/2003 | Pangilinan et al. | 250/227.14 |
| 6,997,061 | B2 | * | 2/2006 | Miragliotta et al. | 73/800 |
| 2005/0052724 | A1 | * | 3/2005 | Suzuki et al. | 359/305 |
| 2007/0089480 | A1 | | 4/2007 | Beck | |
| 2008/0043248 | A1 | | 2/2008 | Ozcan | |
| 2008/0253411 | A1 | * | 10/2008 | McPhail et al. | 372/26 |
| 2010/0150511 | A1 | * | 6/2010 | Arsenault et al. | 385/130 |

FOREIGN PATENT DOCUMENTS

WO WO 2009121000 A2 * 10/2009

OTHER PUBLICATIONS

PCT International Search Report for PCT/US/2009/038631, completed May 7, 2009 and mailed May 20, 2009.
Jang,Ji-Hyun et al., 3D Polymer Microframes That Exploit Length-Scale-Dependent Mechanical Behavior, Advanced Materials, 2006, pp. 2123-2127, Wiley InterScience.
Moon, Jun Hyuk et al., Fabricating Three-Dimensional Polymeric Photonic Structures by Multi-Beam Interference Lithography, Polymers for Advanced Technologies, 2006, pp. 83-93, John Wiley & Sons, Ltd., 2006.
MIT Photonic Crystal Research, Nov 9, 2007, http://ab-initio.mit.edu/photons.
Campbell, M. et al., Fabrication of Photonic Crystals for the Visible Spectrum by Holographic Lithography, Nature, Mar. 2, 2000, pp. 53-56, vol. 404, Macmillian Magazines Ltd. 2000.
Jiang, P. et al., Single-Crystal Colloidal Multilayers of Controlled Thickness, Chemical Materials, 1999, pp. 2132-2140, American Chemical Society Published on Web. Jul. 15, 1999.

(Continued)

*Primary Examiner* — Roy M Punnoose
(74) *Attorney, Agent, or Firm* — RatnerPrestia

(57) ABSTRACT

A method for detecting blast induced pressure changes includes exposing a material, a contained solution, a membrane-bound solution, or a photonic crystal material, having a first optical property, to a pressure wave having a blast level. A change in the first optical property to a second optical property of the exposed material, contained solution, membrane-bound solution, or photonic crystal material is determined, and the extent of change corresponds to the blast level.

24 Claims, 15 Drawing Sheets

OTHER PUBLICATIONS

Parker, Andrew Richard, 515 Million Years of Structural Colour, J. Opt. A: Pure Appl. Opt. 2, (2000) R15-R28, IOP Publishing Ltd, 2000. UK.

Vukusic, Pete et al., Photonic Structures in Biology, Nature, Aug. 14, 2003, vol. 424, pp. 852-855, Nature Publishing Group 2003.

Choi, Taeyi et al., The Elastic Properties and Plastic Behavior of Two-Dimensional Polymer Structures Fabricated by Laser Interference Lithography, Advanced Functional Materials, 2006, pp. 1324-1330, Wiley Interscience, 2006.

Lai, Min et al., Profiting From Nature: Macroporous Copper with Superior Mechanical Properties, Chemical Communication, 2007, pp. 3547-3549, The Royal Society of Chemistry, 2007.

Reed, Evan J. et al., Color of Shock Waves in Photonic Crystals, Physical Review letters, May 23, 2003, vol. 90 No. 20, pp. 203904-1-203904-4, The American Physical Society 2003.

Turberfield, A.J., Photonic Crystals Made by Holographic Lithography, Mrs Bulletin Aug. 2001.

Ashby, M.F. et al., The Mechanical Properties of Cellular Solids, Metallurgical Transactions, Sep. 1983, vol. 14A, pp. 1755-1769.

Ashby, M.F., The Properties of Foams and Lattices, Philosophical Transactions of the Royal Society 2006, pp. 15-30, The Royal Society, 2005.

Yang, Shu et al., Creating Periodic Three-Dimensional Structures by Multibeam Interference of Visible Laser, Chemistry of Materials, Jul. 2002, vol. 14 No. 7, American Chemical Society 2002.

* cited by examiner

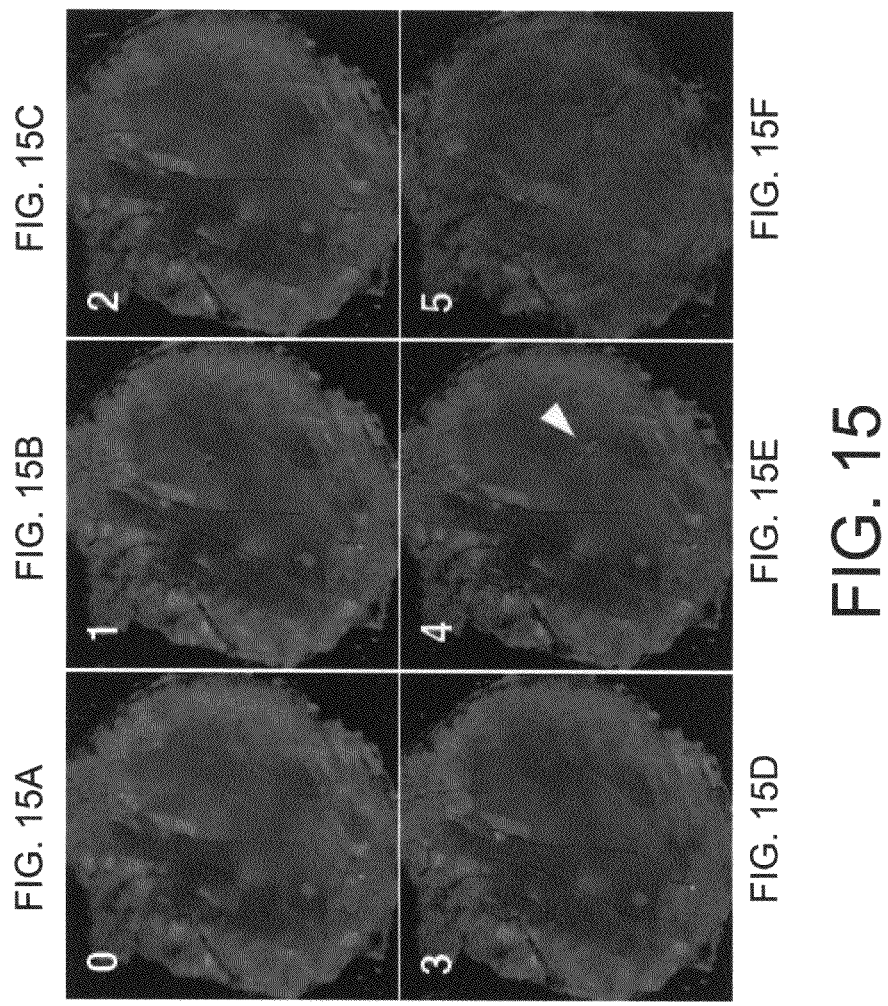

BLAST INJURY DOSIMETER

STATEMENT REGARDING FEDERALLY SPONSORED RESEARCH

This invention is expected to be funded by the Nanotechnology Institute (NTI) Proof of Concept (POC) Fund.

FIELD OF THE INVENTION

The present invention relates to detecting blast conditions and the extent to which a subject has been exposed to such blast conditions.

BACKGROUND OF THE INVENTION

Blast parameters are typically described based on conditions at the source of the blast by evaluating a type and an amount of an explosive used relative to the distance of the blast to the subject. It is desirable to evaluate the parameters of a blast in proximity to the subject (i.e., the person or object exposed to the blast). Many electro-mechanical systems which are used to detect local blast conditions are, in general, complex, expensive, bulky and typically use a power source. There remains a need to detect local blast conditions in a convenient and simple way. Additionally, improved detection may assist in the diagnosis of blast exposure and may aid in the direct medical management of individuals exposed to severe blast conditions.

SUMMARY OF THE INVENTION

According to an embodiment of the present invention, a method for detecting blast induced pressure changes includes exposing a material having a first optical property to a pressure wave having a blast level to permanently alter the material. A change in the first optical property to a second optical property of the exposed material is determined, and the extent of change corresponds to the blast level.

According to another embodiment of the present invention, a method for detecting blast induced pressure changes includes exposing a contained solution having a first optical property to a pressure wave having a blast level to permanently alter the solution. A change in the first optical property to a second optical property of the exposed solution is determined, and the extent of change corresponds to the blast level.

According to another embodiment of the present invention, a method for detecting blast induced pressure includes exposing a membrane-bound solution, where a colorimetric optical property of the solution is obscured, to a pressure wave having a blast level to permanently rupture the membrane and reveal the colorimetric optical property. The revealed colorimetric optical property of the exposed solution is determined, and the colorimetric optical property corresponds to the blast level.

According to another embodiment of the present invention, a method for detecting blast induced pressure changes includes exposing a photonic crystal material, having a lattice structure and a first optical property, to a pressure wave having a blast level. The pressure wave destroys at least a portion of the lattice structure. A change in the first optical property to a second optical property of the exposed photonic crystal material is determined, and the extent of change corresponds to the blast level.

According to another embodiment of the present invention, a method for detecting blast induced pressure changes includes forming a photonic crystal material from a polymer such that the photonic crystal material has a first optical property. The photonic crystal has a lattice structure with an arrangement of apertures. At least a portion of the lattice structure of the material is destroyed by a pressure wave having a blast level. Subsequently, a change in the first optical property to a second optical property of the material is determined where the extent of change corresponds to the blast level.

According to another embodiment of the present invention, a method for detecting blast induced pressure changes includes exposing a photonic crystal material having a lattice structure to a pressure wave having a blast level. At least a portion of the lattice structure of the material is destroyed by the pressure wave. Subsequently, light is transmitted onto the photonic crystal material, and the reflected light is received from the material. An optical property of the material is measured where the optical property is a reflected wavelength of light, a luminance, or a radiance. Based on a relationship between blast level and the optical property, the blast level is determined.

BRIEF DESCRIPTION OF THE DRAWINGS

The invention may be understood from the following detailed description when read in connection with the accompanying drawing. Included in the drawing are the following figures:

FIG. 15A-F are images of a photonic crystal material used in embodiments of the present invention illustrating repetitive, low-level exposure to blast conditions.

DETAILED DESCRIPTION OF THE INVENTION

Figure 1:
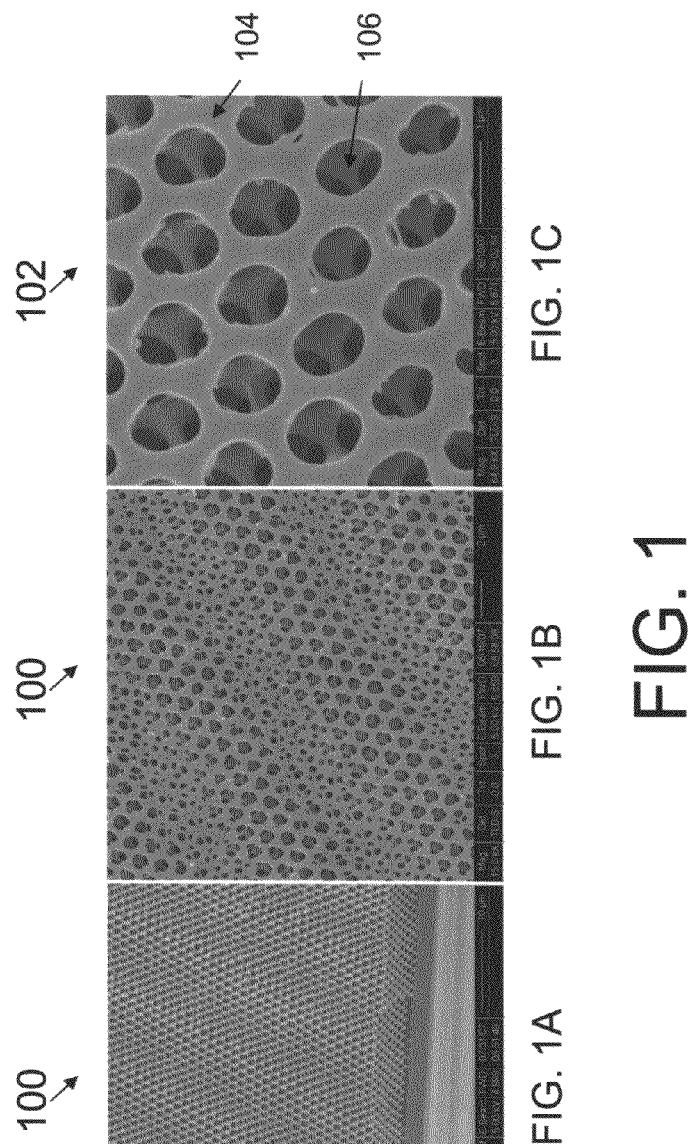
FIGS. 1A-1C are scanning electron micrograph images of photonic crystal material with increasing magnification illustrating an ultrastructure of a photonic crystal material used in the present invention.

Aspects of the present invention include a method for detecting blast induced pressure changes. In a first embodiment of the present invention, a method for detecting blast induced pressure changes comprises exposing a material having a first optical property to a pressure wave having a blast level to permanently alter the material. A change in the first optical property to a second optical property of the exposed material is determined where the extent of change corresponds to the blast level. This may include visibly observing the second optical property. The change in the first optical property to the second optical property may correspond to a change in color of the material. The method may further include evaluating a probability of traumatic brain injury according to a relationship between the second optical property and the blast level.

Although the present invention is described herein with particular emphasis on photonic crystal embodiment, it is contemplated that the present invention may encompass any material having any physical structure or a chemical solution which changes optical properties due to exposure to blast conditions (e.g., a pressure wave).

In an embodiment of the present invention, a photonic crystal material having a lattice structure and a first optical property is exposed to a pressure wave having a blast level. The pressure wave destroys at least a portion of the lattice structure. A change in the first optical property to a second optical property of the exposed photonic crystal material is determined where the extent of change corresponds to the blast level.

Referring now to FIGS. 1A-1C, an exemplary photonic crystal material 100 having a lattice structure is shown. An ultrastructure of the photonic crystal material 100 includes a three dimensional lattice 102 with a periodic arrangement of polymer 104 and air voids or apertures 106. This framework results in a periodic high-porosity polymeric structure 100. The microstructures may consist of several one-micron thick layers comprised of the periodic three-dimensional arrangement of polymer and air voids with an overall diameter ranging from about 1.5 to 6.5 mm. FIGS. 1A-1C generally show images taken from a scanning electron micrograph with increasing magnification illustrating the ultrastructure. FIG. 1A has a scale bar of 10 μm with a magnification of 6.5 kX. FIG. 1B has a scale bar of 2 μm with a magnification of 15 kX. FIG. 1C has a scale bar of 1 μm with a magnification of 64.9 kX. Although in one exemplary embodiment, the three-dimensional lattice 102 may have a diamond-like structure with a given periodicity, it is understood that any suitable structure may be used.

Figure 2:
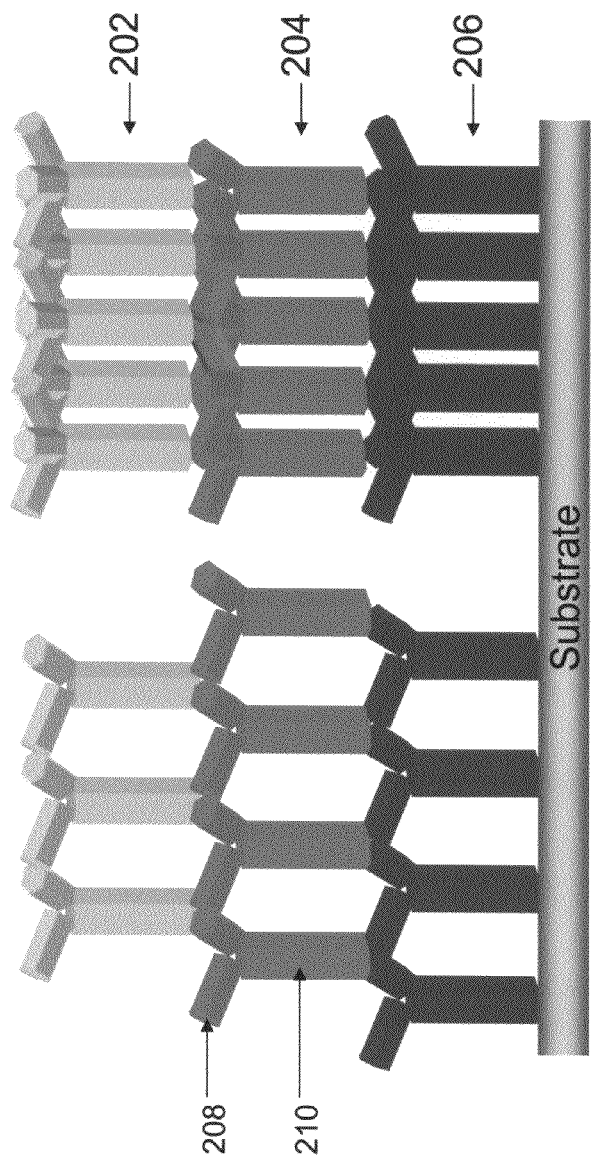
FIG. 2 is a cross-sectional view illustrating a portion of a photonic crystal material used in the present invention illustrating layers that form the photonic crystal material.
Figure 3:
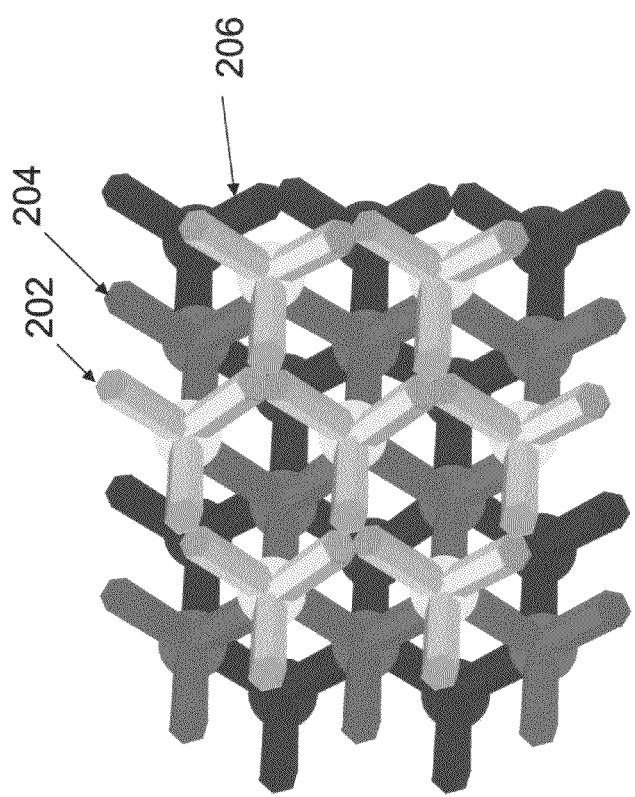
FIG. 3 is a perspective view of the layers of the photonic crystal materials shown in FIG. 2, with the different shading showing the different layers.

Referring to FIGS. 2 and 3, the lattice structure 102 may be defined by a plurality of layers 202, 204, and 206. Each of layers 202, 204, and 206 may be comprised of interconnected posts 210 and struts 208. For clarity, the different colors or shading is used to show the distinct layers, but the posts and struts are all the same material. A perspective view is shown in FIG. 3 of the layers 202, 204, 206 incorporated into the three-dimensional microstructure, with the planes of the layers being parallel to the page of the figure. As explained in "3D Polymer Microframes That Exploit Length-Scale-Dependent Mechanical Behavior" by Ji-Hyun Jang et al., incorporated herein by reference, the four-functional network structure "can be envisioned as a type of continuously joined set of polymer nodes and members, with a basic unit comprising a thick vertical post (L/D ~2.3) supporting three thinner struts (L/D ~3.2), where L is the length and D is the diameter." An exemplary unit cell of the structure includes three layers 202, 204, 206.

The photonic crystal material 100 may comprise a polymer 104 (FIG. 1). More specifically, a negative-tone photoresist polymer may be used. In one exemplary embodiment, Epon SU-8, a commercially available negative-tone photoresist based on a multifunctional glycidyl ether derivative of bisphenol-A novolac epoxy resin may be used. Other materials of interest may include suitable materials in the categories of thermoplastics, elastomers, and thermoelastomers, such as polystyrene, methacrylates, acrylates, polyimide, polyurethane, epoxy and silicones chosen by one skilled in the art. It is understood that any suitable polymer capable of being formed into a photonic crystal material may be used. The use of the SU-8 photoresist ensures that the photonic crystal material is thermochemically stable. Accordingly, the material may be durable even under extreme motion, moisture, and temperature parameters, which often occur in combat situations. Specifically, exposed SU-8 resist is thermally stable (up to 300° C.) and chemically stable due to its aromatic functionality and high cross-link density.

An experimental setup for forming the photonic crystal material by a multi-beam interference lithography process is fully described in "Fabricating Three-Dimensional Polymeric Photonic Structures by Multi-Beam Interference Lithography" by Moon et al., incorporated herein by reference. Specifically, the interference of four collimated, coherent laser beams may produce a face center cubic (fcc) pattern. Four lasers beams may produce an intensity grating with a three-dimensional periodicity if the difference between the wave vectors is non-coplanar. The experimental setup illustrates one approach for four-beam interference lithography. A sample polymer (initially as a solid block) is placed on a sample stage. A visible or ultraviolet (UV) laser beam is divided or split into multiple beams (for example four beams) using beam splitters. The beams are then recombined and are directed to the polymer at the sample stage by a mirror to obtain a desired geometry. A half-wave plate and a polarizer may be used to regulate a polarization and an intensity of the beams.

Figure 4:
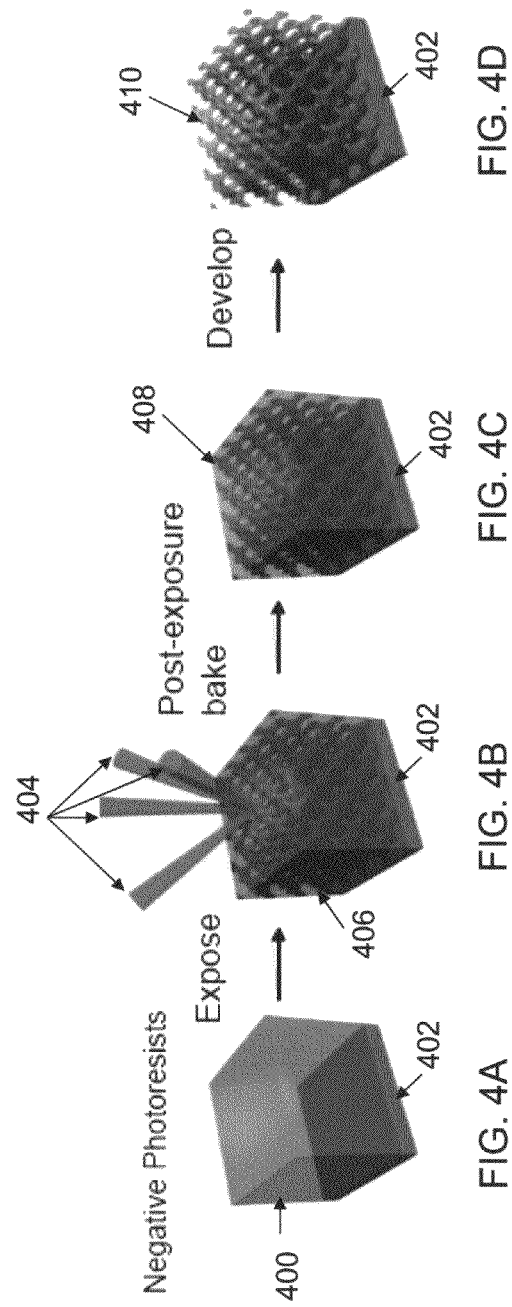
FIGS. 4A-4D illustrates the process for forming a photonic crystal material used in the present invention using four-beam interference lithography.

Referring now to FIGS. 4A-4D, the process of four-beam interference lithography as it is applied to the polymer or photoresist film 400 on a substrate 402 is illustrated. The photonic crystal material 410 may be prepared using an optical patterning of photopolymers. FIG. 4A shows a photopolymer or photoresist film 400 on substrate 402 prior to the lithography process. The combined beams 404 are focused on photoresist film 400 to produce a desired lattice pattern 406 (FIG. 4B). The material may be fabricated by a single exposure, within a few nanoseconds to a few seconds, of visible or UV light. In a negative-tone photoresist, crosslinking occurs in the exposed areas when the intensity of the interference pattern exceeds the lithographic threshold of the photoresist.

This threshold may be a function of a photoresist sensitivity, a processing following exposure, and/or a contrast of the interference pattern. In FIG. 4C, after exposure, a post-bake exposure process is performed and produces material 408. In FIG. 4D, the material 410 is subsequently developed where any unexposed areas of 408 are removed or washed away by a developer (an organic solvent, e.g., propylene glycol monomethyl ether acetate (PGMEA, Aldrich)) while the exposed regions remain to form material 410. The material 410 may be dried using any known technique, such as baking. Although not illustrated, the substrate 402 may be subsequently removed from material 410. Material 410 can be made up of struts and posts, as depicted in FIGS. 2 and 3.

The multi-beam interference technique shown in FIGS. 4A-4D produces the multi-layered, three-dimensional structure of photonic crystal material 410. In one embodiment, the three-dimensional structure is diamond-like with a periodicity of about 1 µm, but the periodicity may range from about 0.3 µm to 10 µm. The structure may be diamond-like, but, as can be appreciated by one skilled in the art, different structural patterns may be produced by varying the beam geometry (wave vectors and polarization vectors). A porosity of the structure may be varied by the laser intensity or sensitivity of the photoresist. Other lattice structures may include simple cubic, face-centered cubic, body-centered cubic, and gyroid lattices. The number of layers may be controlled by the photoresist thickness. In one embodiment, the material consists of six layers by using a photoresist thickness of 6 µm. The photoresist thickness may range up to about 400 µm. A photoresist thickness ranging from about 1 µm to about 100 µm may produce a material from about 1 to 100 layers. Depending on the periodicity and symmetry of the lattice, there may be coordination between the thickness and the number of layers. According to an exemplary embodiment, in the case of fcc or diamond-like structures, the distance between layers is about 1 µm, therefore, the number of layers approximates the thickness of the film.

Although a four-beam lithography process is described, it is understood that a three-dimensional microstructure may be obtained by any suitable techniques commonly known in the art. Other techniques may include, for example, crystallization of colloidal particles, microphase separation of block copolymers, three-axis micropositioner assisted deposition of polymer melts and solutions (e.g. rapid prototyping, pressure assisted microsyringe deposition, focused-ion-beam etching, and direct-write assembly, layer-by-layer stacking through soft lithography, glancing angle deposition (GLAD), and multi-photon absorption at near-IR.

The formed photonic crystal material 410 (FIG. 4D) has certain optical properties due to the lattice structure 102 (FIG. 1C). Optical properties, as used herein, may include one or more wavelengths within the electromagnetic spectrum transmitted or reflected by the material (for example, a wavelength of 530 nm corresponds to green light within the visible spectrum), a color profile across the material, a color or absence of color, luminance, radiance, brightness, or any other visual property observable or measurable on the material. As used herein, the term "color profile" is intended to mean the range of particular colors exhibited by the material across its surface and the effect on the viewed color at the various regions of the material. The color profile may change as a function of a viewing angle, described further below. Luminance may be defined as an indicator of how bright the material appears and may be measured in candela per square meter ($cd/m^2$). Additionally, radiance may be an indicator of how bright the material appears and may be measured in watts per steradian per square meter ($W \cdot sr^{-1} m^{-2}$). It is recognized that any suitable visual or measurable technique may be used to determine optical properties of the material.

Photonic crystals are also considered to be photonic bandgap materials and are known in the art as periodic dielectric structures. Referring back to FIGS. 1A-1C, the optical properties of the photonic crystal material 100 may be a function of the periodic structures formed by the combination of polymer 104 and apertures 106. Without being bound to any particular theory, when light arrives at the surface of the material, the material 100 diffracts some of the light and some of the light also reflects due to constructive interference of light waves in material 100. For example, two reflected light waves may be shifted by an integer multiple of a wavelength when constructively interfering in the material. The interference may occur between reflections from the different interfaces of the periodic structure. Air (in apertures 106) has a refractive index of approximately 1.0, or hereafter, a "low" refractive index. The polymer material 104 has a "high" refractive index relative to air. In an exemplary embodiment, the polymer material has a refractive index of about 1.6. The refractive index may range from about 1.3 to 2.0, and may range from about 1.3 to 4.0 for inorganic materials. It is understood that any suitable material with an appropriate refractive index may be used. The interference of alternately high and low refractive indexes result in so-called structural color which is similar to an opalescent effect. When the periodic modulation of the refractive index is arranged in three dimensions on a length scale comparable to the wavelength of the incident light, interference of the light waves scattered from the dielectric lattice (i.e. Bragg scattering) may lead to stop bands or photonic band gaps, that is a certain range of wavelengths of light may be totally reflected by the photonic crystal.

The photonic crystal material 100 (or other materials, contained solutions, membrane-bound solutions, etc.) may be formed to have desired optical properties (such as to reflect particular wavelength(s) of light) as a function of the material properties. In particular, the material may be formed to provide a response to rapid pressure exposure in a dose-dependent manner.

The optical properties, for photonic crystal material 100 for example, may depend on the following factors, among others: a dielectric constant (or refractive index) contrast of a high refractive index material versus air, a symmetry of the lattice structure, a porosity of material (or volume filling fraction of the high index material), and/or a periodicity (or lattice symmetry) of material 100. An aspect ratio is defined herein as the relationship between height and width or between post 210 and struts 208, depending on the structure of the lattice (FIGS. 2 and 3). The aspect ratio is part of lattice symmetry and may not be considered separately as a parameter that may impact the optical properties, but it may be considered an important parameter that impacts mechanical properties.

Figure 5:
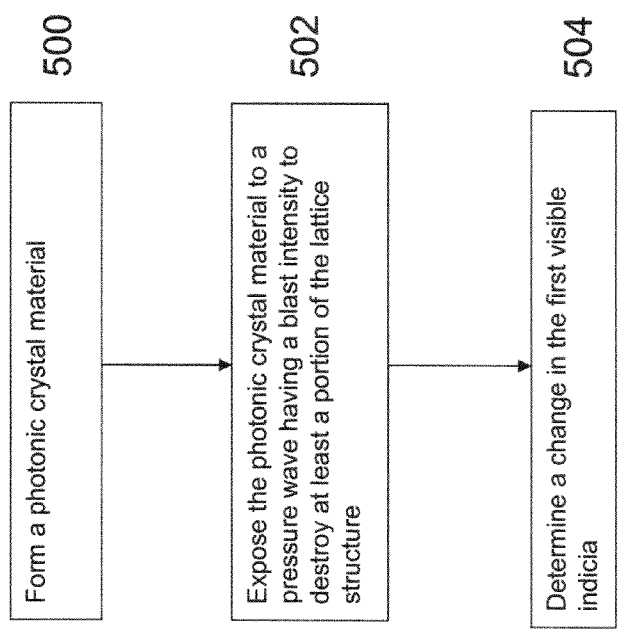
FIG. 5 is a flowchart illustrating a method for utilizing a photonic crystal material used in the present invention to determine a blast intensity according to an embodiment of the present invention.
Figure 6:
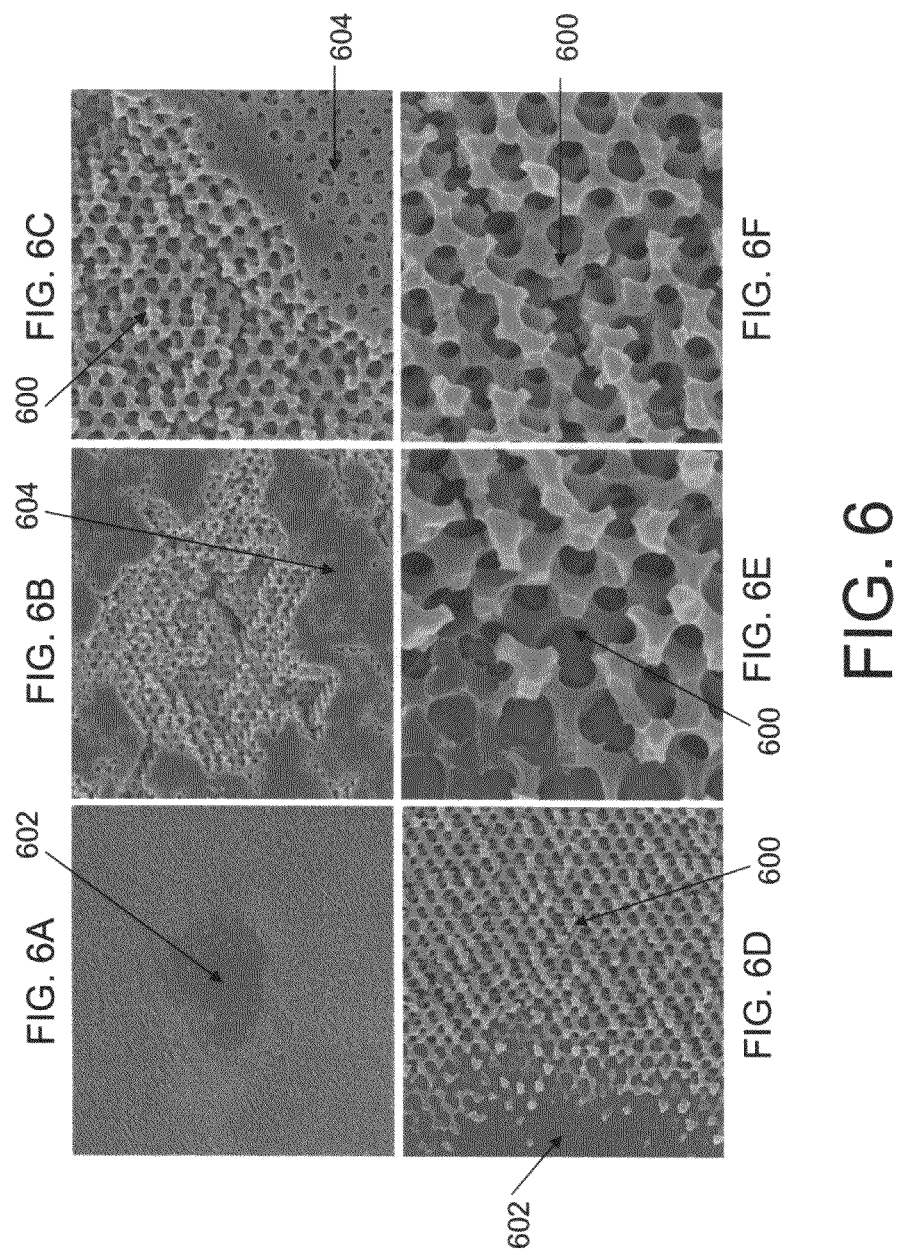
FIGS. 6A-6F are images of the photonic crystal material illustrating different areas of failure within the photonic crystal material structure.

Referring now to FIG. 5, a flow chart illustrates an exemplary method of the present invention to determine a blast level. At step 500, a photonic crystal material 410 is formed with a lattice structure and having a first optical property. At step 502, the photonic crystal material is exposed to a pressure wave having a blast level, which results in the destruction of at least a portion of the lattice structure. In one embodiment, the portion of the lattice structure which is destroyed is a portion sufficient to impart a change in optical properties of the material, such as to cause a change in the visible color of a discrete portion of the material, a change in luminance or a combination of a change in visible color and luminance of the material. Subsequently, at step 504, a change in the first optical property to a second optical property of the exposed photonic crystal material is determined where the extent of change corresponds to the blast level.

Referring to FIGS. 6A-6F, when the photonic crystal material 410 is exposed to supra-threshold rapid pressure waves, changes in material ultrastructure may be readily observed. At least a portion 600 of the lattice structure fails. Portions of the lattice structure affected by the supra-threshold pressure waves are shown in FIGS. 6A-6F, which are scanning electron micrographs with increasing magnification (6A: 2.8kX; 6B: 10.0kX; 6C: 20.0kX; 6D: 15.0kX; 6E: 65.0kX; 6F: 50.0kX). Specifically, a portion 600 of the arrangement of apertures may be destroyed (e.g., breakage of the material around the pores) or one or more of the layers in the three-dimensional structures may be destroyed. Complete material failure and loss revealed the base substrate 602. Additionally, there may be layer-by-layer failure following high intensity pressure exposure, resulting from column breaks within layers, with, in some cases, maintenance of several residual layers 600. The original material surface 604 can also be observed where not destroyed (e.g., the material makeup prior to exposure). These micrographs reveal that exposure to extremely rapid, high pressure fluctuations may result in two mechanisms of failure: (1) complete (local) loss of material or (2) graded, layer-by-layer failure consisting of columnar collapse and layer erosion. Thus, this failure of the structure may result in at least a partial collapse of the three-dimensional microstructure or the material may be removed either partially or completely.

The failure or destruction of the material or solution including a photonic crystal material lattice structure may result in a change in the optical properties of the material, for instance, to a second optical property. A change may be manifested by a change in the portion of spectrum reflected by the material or solution, the wavelength(s) reflected from the material or solution, the color profile across the material or solution, a specific color or absence of color, luminance, radiance or any other visual property observable or measurable on the material or solution. Thus, the material structure allows colorimetric properties to be macroscopically observable across the visible spectrum. In particular, for the photonic crystal material, when the nano-scale structural undergoes failure due to exposure to blast shockwave, an observable color change is created relative to the severity of the blast.

Figure 7:
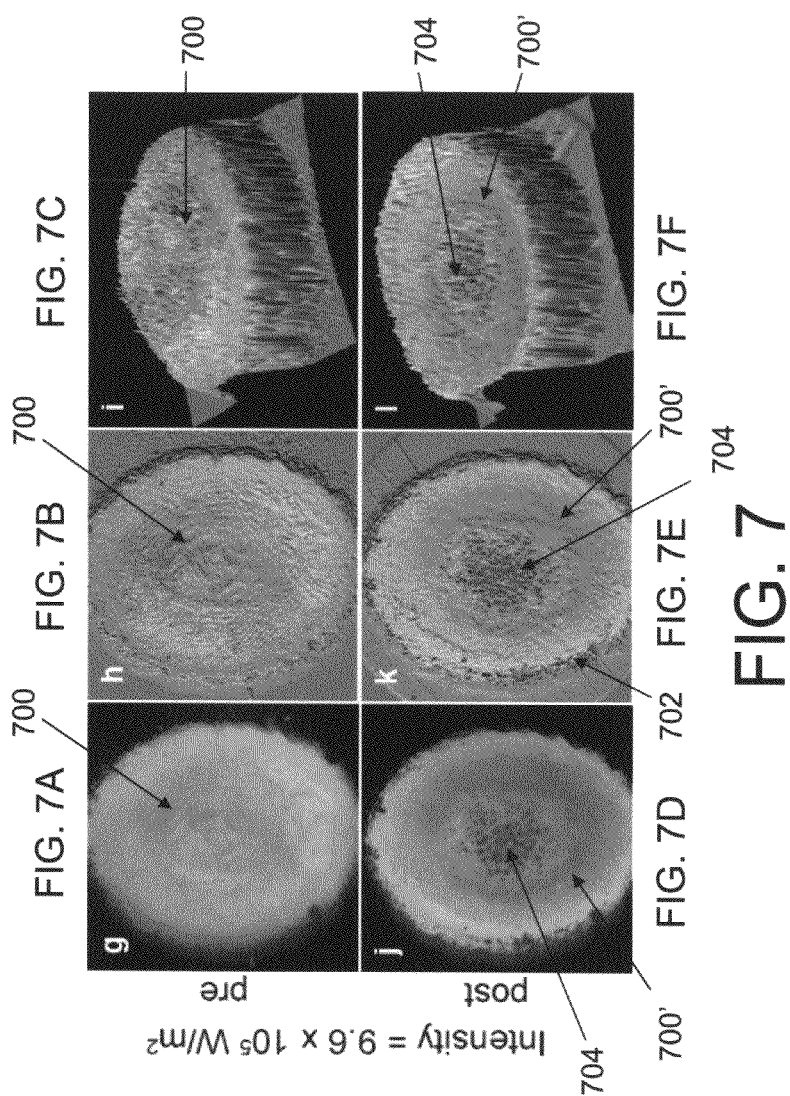
FIGS. 7A-7F are images of a photonic crystal material used in the present invention illustrating pre- and post-exposure to surrogate blast conditions at a high blast intensity of $9.6 \times 10^5$ W/m$^2$.

Referring now to FIGS. 7A-7F, a colorimetric alteration was observed following a single pulse of high intensity pressure exposure at $9.6 \times 10^5$ W/m$^2$ applied focally to the central portion of the sample (blast injury dosimeter). The images in FIGS. 7A and 7D were generated through light microscopy at 10× magnification. The baseline photonic crystal material 700, is shown in FIG. 7A prior to exposure. The color of material 700 in FIG. 7A is fluorescent yellow and green (bright yellow around the edges and in the center and bright green in patches). FIGS. 7B and 7C show the corresponding surface plots of the baseline photonic crystal material 700 generated from a top view (FIG. 7B) and a rotated view (FIG. 7C), respectively. The photonic crystal material 700' subsequent to exposure at $9.6 \times 10^5$ W/m$^2$ is shown in FIG. 7D. The color of material 700' in FIG. 7D is a dull grey with some dark grey/black spots in the center (also some subtle/muted hues of blue and pink are present). There is a marked change in the photonic crystal material 700' with a decrease in color, loss of material at edges 702, and material loss in the center 704 indicated by a complete absence of color. The corresponding surface plots of the exposed photonic crystal material 700' are shown from a top view (FIG. 7E) and a rotated view (FIG. 7F), respectively.

The change in optical properties may also be a function of the material or solution properties, as discussed above, factors such as dielectric constant contrast, symmetry of the lattice structure, and porosity. Additionally, the material may be more or less fragile depending on the glassy or elastomeric properties of the polymer used. This may also be defined by the Young's modulus or mechanical force needed to destroy portions of the lattice structure. In an embodiment of the present invention, the photonic crystal material utilizes the fact that the change in optical properties is a function of the number of layers or thickness of the material. As the thickness decreases in response to a blast exceeding a threshold blast level, the wavelength or luminance of the light reflected at that region will change.

Figure 11:
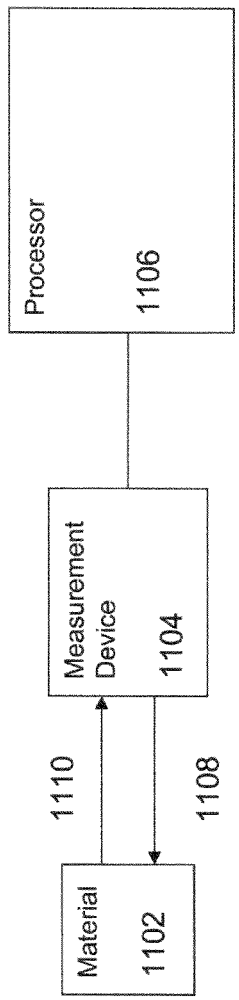
FIG. 11 is a flowchart illustrating a system for measuring the optical properties of a photonic crystal material used in the present invention and/or determining the blast level based on the optical properties.

The optical properties associated with the material or solution including the photonic crystal material may be visibly observed or measured. Referring to FIG. 11, to measure the optical properties, one technique may be to use a measurement device 1104 with attached processor 1106 to transmit light 1108 onto material 1102 and receive light (or other appropriate properties) 1110 reflected from the material 1102. For instance, the measurement device 1104 (e.g., Fourier transform infrared spectroscopy, optical analyzer, spectroradiometer) may measure a wavelength, luminance, radiance, or a similar quantifiable metric. A correlation to blast level or intensity may then be developed based on certain blast parameters. Thus, the extent of change in optical property corresponds to the blast level.

For example, control materials may be subjected to a known blast level, for a known duration, at a set distance. These post-exposure materials may be evaluated to determine their reflected wavelength, luminance, radiance, or similar metric. The wavelength of light transmitted onto the material 1102 by the measurement device 1104 should also be a controlled factor. Because these post-exposure materials are exposed to known conditions (e.g., a series of known blast levels), a correlation may be determined between the resultant optical property and the given blast level. Therefore, relationships may be developed into some correlative function or equation. Alternatively, one could develop a set of empirical data (e.g., a matrix, a chart, or a look up table) based on the optical property responses to one or more sets of blasts of known levels at a given distance from the material for a given time.

Once a correlation has been defined, a material or solution exposed to an unknown blast level may be measured by the measurement device 1104. The measurement device 1104 may determine its optical properties by the reflected light (or other properties such as wavelength or luminance) 1110. The processor 1106 may then determine the blast level for the material based on the previously correlated relationship between blast level values and the optical properties of the material or solution. This allows for a determination of blast level based on the final condition of the material or solution (post exposure).

Due to the nature of the material and its opalescent qualities, the material including the photonic crystal material may change optical properties relative to the viewing angle. Therefore, in an exemplary embodiment the viewing angle may be fixed substantially perpendicular to the surface of the material. For instance, a fixed light source (not shown) may be positioned approximately 30 to 60 degrees from the horizontal, and the material may be viewed substantially perpendicularly. For example, a tubular apparatus (not shown) may be used where the light source is fixed in position, and the viewing angle is restricted to the proper angle.

The material, contained solution, membrane-bound solution, or photonic crystal material may be responsive to blast conditions. For example, the photonic crystal material 410 (FIG. 4D) may be responsive to pressure waves corresponding to a certain blast level. A pressure wave typically results in a rapid rise in pressure. As used herein, the blast level is intended to mean a shockwave, energy from or specific to a blast wave, high pressure, high frequency acoustical waves, rapid overpressure, or similar blast associated conditions. The blast level may include the blast intensity, blast strength, degree of the blast, severity of the blast, or other descriptive characteristics of the blast. Blast intensity may be measured in watts per square-meter ($W/m^2$) which accounts for energy per area at a certain distance. The shockwave exposure may also be characterized by peak overpressure, for example quantified in pounds per square inch (psi) or mega Pascal (MPa). Typical exposures may range from one to several hundred milliseconds in duration. Therefore, these blast levels may be a function of the intensity of the blast, the time the material is exposed to the blast, the distance relative to the blast, or other similar factors which may be appreciated by the skilled person.

Figure 14:
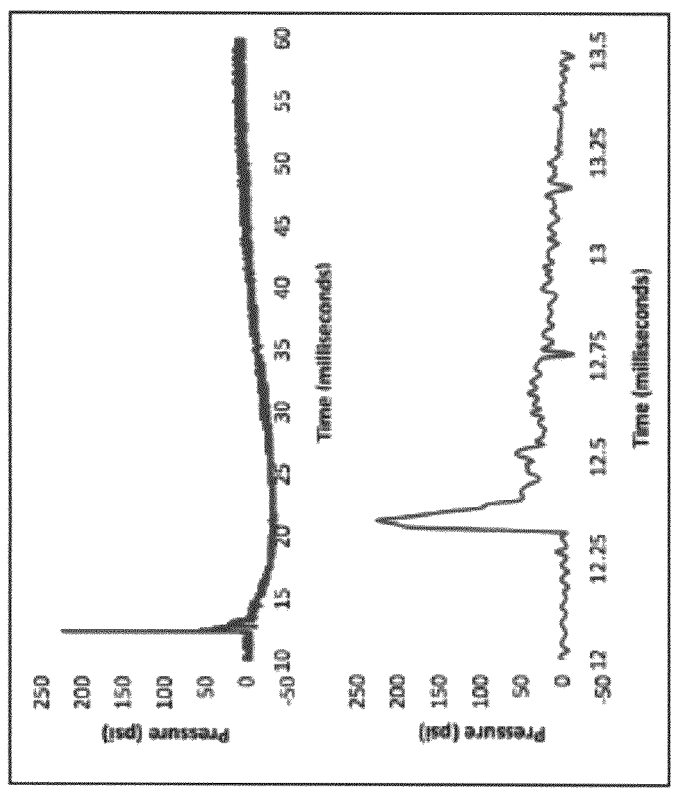
FIG. 14 is a graph (and a magnified portion of the x-axis of the graph) illustrating example blast wave pressure-time characteristics generated using an explosive shocktube.

FIG. 14 depicts the pressure-time characteristics for an example blast wave generated using an explosive shocktube. This surrogate model replicates key components of a true blast including rapid shockwave with relatively protracted underpressure/overpressure phases. The top graph is magnified in the lower graph for the 12 to 13.5 millisecond time scale. The explosive-driven shocktube was utilized to test the responses of embodiments of the blast injury dosimeter for more realistic blast conditions. The explosion in the cylindrical shocktube generated high fidelity pressure-time waves consisting of microsecond-scale pressure rise-times (i.e. shockwave) and millisecond-scale overpressure/underpressure components.

The materials or solutions, including the photonic crystal material 410, may have a blast level threshold. Thus, the material may not change optical properties unless this threshold is satisfied, i.e. when the blast level of the pressure wave is greater than the threshold value. The threshold may be satisfied by a single blast at a given intensity, time, or distance. Alternatively, the threshold could be satisfied by a cumulative sum of blast levels (e.g., repeated exposure to blast insults) from a plurality of blasts. Accordingly, cumulative exposure levels may be measured over time. Blast injury dosimeters exposed to repeated insults at low magnitudes of overpressure did not result in material failure or alterations in the colorimetric properties. When the blast injury dosimeters were exposed to repeated insults at higher magnitudes of overpressure (e.g. an exposure threshold was surpassed), a colorimetric change did result. For example, FIGS. 15A-15F show repetitive, low-level exposure to blast conditions. Blast injury dosimeters were exposed to repeated insults at intensities increasing over three orders of magnitude. FIG. 15A shows a baseline prior to exposure (bright green and blue in color with flecks of red/orange), and FIGS. 15B-F show repeated insults. Low level exposure did not induce color change (FIGS. 15B and 15C are still bright green and blue in color with flecks of red/orange). Repeated exposure induced a focal color loss (FIG. 15E is still bright green and blue in color with flecks of red/orange, but at white arrowhead there is a dark grey/black patch), followed by a nearly complete loss of color (FIG. 15F is almost completely dark grey/black). Thus, upon escalating exposure, material failure was seen, e.g., color change/loss (FIG. 15F is almost completely dark grey/black). Accordingly, lower intensity overpressure did not alter the colorimetric profile, indicating blast injury dosimeter durability. In addition, this indicates the materials may be tuned to provide dose-dependent responses.

In order to adjust the blast level threshold, the material may be altered, for example, by modifying the structural attributes or chemical makeup of the material. The structural attributes may be modified based on the laser/etching conditions, e.g., modifying the pore size. Geometric features may be modified, such as pore size, pore density, strut length/thickness, the layer thickness, or number of layers. For example, increasing the pore size may cause the material to undergo a change in optical properties at a lower level blast. In addition to these geometric alterations, changing processing parameters may affect the relative contributions of the yield strength and elastic properties, thus affecting fail stresses and the nature of the subsequent failure on the nano-scale. The chemical makeup may be modified, for example, by doping the lattice structure, for instance, with metal ions, to weaken the struts and posts. Without wishing to be bound to a particular theory, the doping may modify the failure response of the photonic crystals. Each of these parameters may lead to preferential failure under different blast magnitudes and frequencies. Thus, the blast level threshold may be tuned based on the associated levels of traumatic brain injury.

The change in the material may also be a function of the angle in which the pressure wave impacts the material. For instance, a uniform, evenly distributed pressure wave (i.e. under far-field conditions) may cause a different response than a pressure wave contacting the material under near-field conditions. Additionally, a near-field shockwave may have a different impact profile from a far-field shockwave.

Human exposure to blast conditions with extremely rapid, high magnitude pressure fluctuations, or shockwave may result in severe injury. Blast-related injuries are classified as primary, secondary, and tertiary injuries. Primary injury is specific to rapid shifts in air pressure associated with explosive scenarios. Secondary injury includes physical impact of the subject with objects propelled by the explosion (i.e., shrapnel). Tertiary injury involves the transfer of blast energy directly to the subject, resulting in rapid acceleration of the subject and possible collision with a stationary object (impact/deceleration). Of particular interest is primary blast injury which may result directly from rapid blast-associated pressure changes (i.e., shockwave). Injuries, such as traumatic brain injury, may occur even absent overt physical or cognitive signs because cellular or sub-cellular damage may manifest subtly and be slowly progressive. The potential pathological manifestation includes traumatic diffuse axonal injury, disruption of cell bodies, and microvascular disruption or abnormality. In an exemplary embodiment, the present invention may assist in evaluating potential injuries to the brain, chest, or other areas of the body and may correspondingly help to reduce combat-associated morbidity and mortality. Once again, one could develop a set of empirical data by noting the change in optical properties of a control material in response to a blast of an intensity which is known to cause a particular type of injury to a particular body part.

As there is no set convention for standardizing reported blast levels, blast thresholds may be based on, for example, sustained overpressure levels. Blast levels inducing brain injury may vary over several orders of magnitude depending upon the particular description (e.g., peak shockwave pressure versus sustained overpressure), method of measuring pressure (e.g., face-on versus side-on, sampling rate), degree of exposure (e.g., whole body, head, or brain directly), and the sensitivity of particular outcomes. In an embodiment of the invention, a photonic crystalline sensor showed an optical property change following a blast exposure with peak overpressure ranging from approximately 100-750 psi (700 kPa-5.2 MPa) and sustained mean overpressure ranging from approximately 25-75 psi (170-520 kPa), the overpressure phase lasting approximately 1-2 milliseconds (FIG. 14). This range of mean overpressure has previously been demonstrated to induce brain injury.

In side-by-side studies, we evaluated colorimetric changes in blast injury dosimeters and brain injury in rats. The dosimeters and the rats were independently exposed to blast shockwave produced by the same explosive shocktube. We identified a level of blast that induced only very minimal neuropathological changes, such as neuron cell death and axonal damage, evaluated using routine histological staining methods. Within this range of blast severity, we also found a colorimetric change in selected iterations of the blast injury dosimeter. These data confirm the ability to calibrate color changes in the blast injury dosimeter to the extent of brain pathology.

Figure 8:
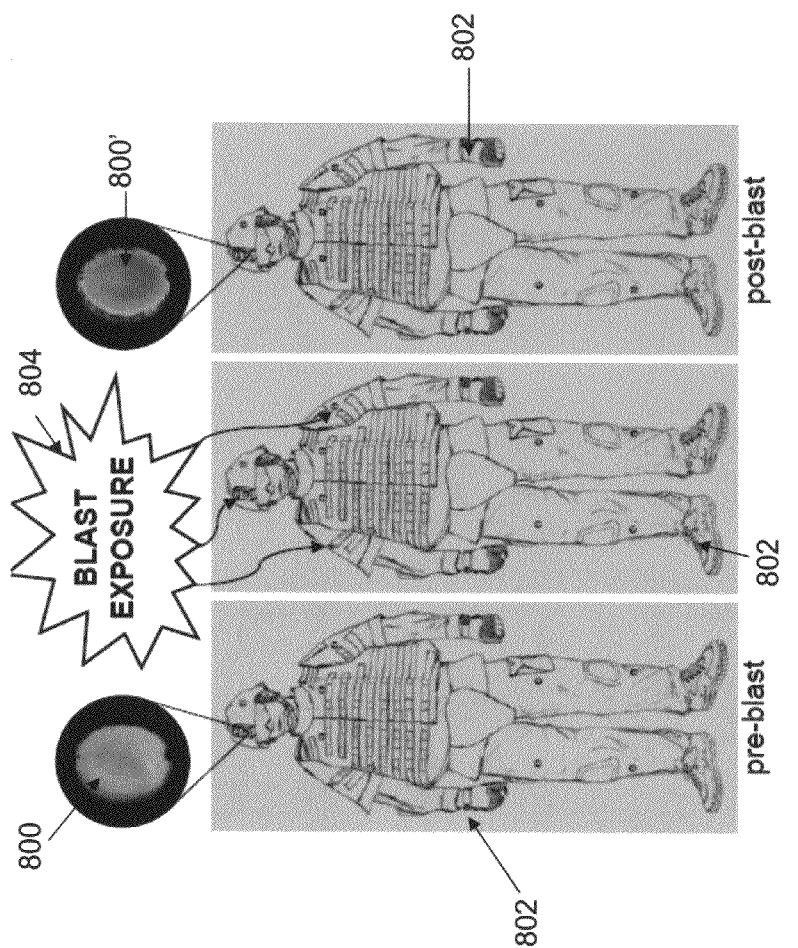
FIGS. 8A-8C are illustrations of an exemplary use of the photonic crystal material for a soldier who may be exposed to blast conditions according to an embodiment of the present invention.

Referring now to FIGS. 8A-8C, the blast injury dosimeter 800 may be used as one or several one-square cm patches. Macroscopically, the blast injury dosimeter 800 may resemble small colored stickers adhered to a thin flexible sheet. For instance, the material may be incorporated into a patch wearable on clothing, such as on soldiers' uniforms 802. The patch may be easily accommodated across multiple locations on and in helmets and uniforms. Upon exposure 804 to the supra-threshold pressure waves (FIG. 8B), the blast injury dosimeter 800 (color of material 800 is fluorescent yellow and green with bright yellow around the edges and in the center and bright green in patches) undergoes a change in optical properties such as a colorimetric change to produce an exposed blast injury dosimeter 800' (FIG. 8C). The color of material 800' in FIG. 8C is a dull grey with some dark grey/black spots in the center (also some subtle/muted hues of blue and pink are present). The likelihood or probability of traumatic brain injury may be evaluated according to a relationship between the second optical property and the blast level. This evaluation may assist in diagnosing potential injuries to the brain, chest, or other areas of the body and assessing whether a soldier should remain in that combat scenario.

As noted above, although described above with particular emphasis on the photonic crystal embodiment, it is contemplated that the present invention may encompass any physical structure or chemical solution which changes optical properties due to a pressure wave. Examples include a mechanical disruption or chemical reaction which physically alters the structure of a material, a colorimetric fluid (e.g., dye, paint) contained or enclosed in a membrane (e.g, macro- or micro-paintballs) which may rupture or fail (e.g., the enclosed fluid rapidly expands), a phase change in a material or chemical solution, a catalyst for a chemical reaction within a material or solution, shear stress in a fluid or gelatinous matrix (e.g., fluid shear stress sensitive dyes or liquid-crystal), surface coatings (liquid-crystal coating on a small rigid surface) or other suitable materials or chemical solutions.

Any of the above examples result in a change from a first optical property to a second optical property of the material or solution following exposure to a blast (e.g., a blast wave, high pressure, high frequency acoustical waves, a rapid "overpressure", or a shockwave). An embodiment of the present invention may include membrane bound fluids (of variable viscosity, for instance) where energy from the blast wave induces cavitation (which rapidly expands the fluid to induce membrane failure) or catalyzes a chemical reaction (which may generate heat and/or expand the fluid to rupture the membrane), thus resulting in release (loss of encapsulation) of the colorimetric dye or fluid. Another embodiment of the present invention may include a membrane-bound solution, where the colorimetric optical property of that solution is obscured or is not readily observable. After exposure to a pressure wave having a blast level the membrane may be permanently ruptured to reveal a colorimetric optical property.

EXAMPLES

Although the invention is illustrated and described herein with reference to specific embodiments, the invention is not intended to be limited to the details shown. Rather, various modifications may be made in the details within the scope and range of equivalents of the claims and without departing from the invention.

Using multi-beam interference lithography (FIGS. 4A-4D), a three-dimensional microstructure material was constructed using a polymer negative-tone photoresist. In one exemplary embodiment, SU-8, a commercially available (e.g., available from Shell Chemicals) negative-tone photoresist, was used. The material was fabricated by a single exposure of visible light 404 (FIG. 4B) for a few seconds at a wavelength about 532 nm. The multi-layered, three-dimensional diamond-like structure 410 has a periodicity of about 1 µm (FIG. 4D). The material consisted of six layers by using a photoresist thickness of 6 µm.

The materials produced were evaluated by exposure to blast like conditions using an ultrasonication device. Ultrasonication generates extremely rapid pressure fluctuations that are similar in some respects to blast induced shockwaves. Ultrasonication can produce pressure magnitudes on the order of 1-10 MPa with pressure change rise-time on the order of 10 microseconds. Additionally, the ultrasonication device is capable of modifying the power input to regulate the blast intensity, in order to better evaluate the response of the materials to graded insult levels. The intensity is proportional to the output power and inversely related to the square of the distance from the source. The point intensity decreases rapidly as the distance from the source increases which also occurs for true blast shockwave propagation.

Figure 10:
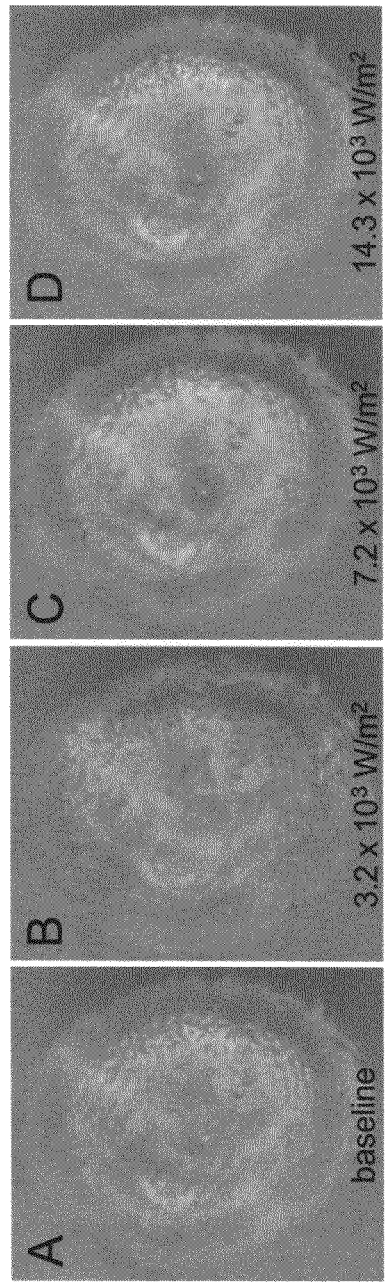
FIGS. 10A-10D are images of a photonic crystal material used in the present invention illustrating results from an experiment at escalating pressure fluctuations from low to high.

Referring to FIGS. 10A-10D, the formed photonic crystal materials were exposed to low intensity pressure fluctuations. Low intensity pressure exposures are in the range of 3.2 to $14.3 \times 10^3$ W/m$^2$. Specifically, baseline photonic crystal materials (FIG. 10A shows a subtle yellow edge, a blue ring near the edge, and a subtle yellow center with darker spots) were exposed to blasts at $3.2 \times 10^3$ W/m$^2$ (FIG. 10B), $7.2 \times 10^3$ W/m$^2$ (FIG. 10C), and $14.3 \times 10^3$ W/m$^2$ (FIG. 10D), respectively, each for approximately 500 milliseconds. The low pressure exposures did not visibly alter the optical properties (FIGS. 10B-D also show a subtle yellow edge, a blue ring near the edge, and a subtle yellow center with darker spots). This demonstrates that the material may be extremely durable if exposed to low intensity stimuli.

Referring to FIGS. 7A-7F, further experiments demonstrated a marked change in the optical properties of the material. The change in optical properties included a colorimetric alteration following a single pulse of high intensity pressure exposure ($9.6 \times 10^5$ W/m$^2$). The images in FIGS. 7A and 7D were generated through light microscopy at 10× magnification. The baseline 700 is shown (FIG. 7A shows material 700 which is fluorescent yellow and green with bright yellow around the edges and in the center and bright green in patches) prior to exposure. FIGS. 7B and 7C show corresponding surface plots of the baseline generated from a top view (FIG. 7B) and a rotated view (FIG. 7C), respectively. The exposed photonic crystal material 700' demonstrates a striking change in the material with a decrease in color, loss of material at edges 702, and material loss in the center 704 indicated by a complete absence of color. The color of material 700' in FIG. 7D is a dull grey with some dark grey/black spots in the center (also some subtle/muted hues of blue and pink are present). The corresponding surface plots show a top view (FIG. 7E) and a rotated view (FIG. 7F), respectively. The rotated view (FIG. 7F) clearly shows a loss of material in the center 704 of the material 700'.

Figure 9:
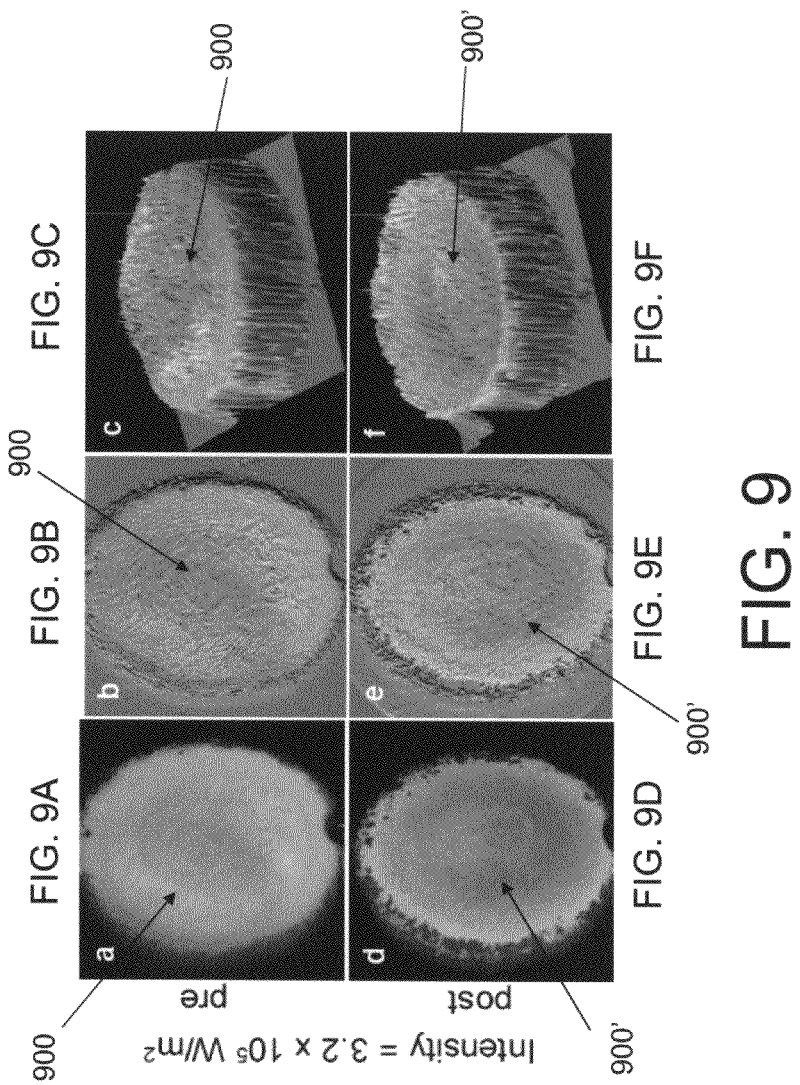
FIGS. 9A-9F are images of a photonic crystal material used in the present invention illustrating pre- and post-exposure to surrogate blast conditions at a pressure intensity of $3.2 \times 10^5$ W/m$^2$.

Referring to FIGS. 9A-9F, a change in optical properties is shown following a moderate to high intensity pressure exposure ($3.2 \times 10^5$ W/m$^2$) applied focally to the central portion of the sample (dosimeter). The images in FIGS. 9A and 9D were generated through light microscopy at 10× magnification. The baseline 900 is shown prior to exposure (FIG. 9A shows material 900 which is fluorescent yellow and green with bright yellow around the edges and in the center and bright green in patches)). FIGS. 9B and 9C show corresponding surface plots of the baseline generated from a top view (FIG. 9B) and a rotated view (FIG. 9C), respectively. The exposed photonic crystal material 900' is shown in FIG. 9D. There is a change in the material 900' with a decrease in color and loss of material at the edges. The color of material 900' in FIG. 9D is a dull grey with some subtle/muted hues of blue. The corresponding surface plots show a top view (FIG. 9E) and a rotated view (FIG. 9F), respectively. These plots demonstrate a subtle loss of material in the center of the material 900'. The materials respond in a graded manner based on the relative strength of the high intensity pressure fluctuations.

Embodiments of the blast injury dosimeter were also tested by simulating realistic blast conditions generated from an explosive-driven shocktube. FIG. 14 depicts the pressure-time characteristics for an example blast wave generated using an explosive shocktube. This surrogate model replicates key components of a true blast including rapid shockwave with relatively protracted underpressure/overpressure phases. The top graph is magnified in the lower graph for the 12 to 13.5 millisecond time scale.

Figure 12:
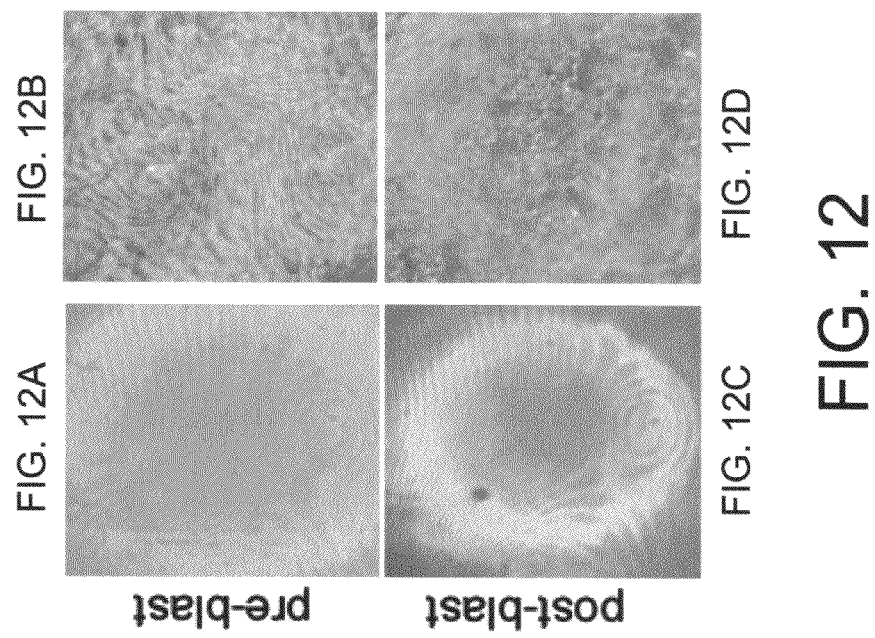
FIGS. 12A-12D are images of a photonic crystal material used in embodiments of the present invention illustrating pre- and post-shockwave exposure with peak overpressure of 228 psi.

Referring to FIGS. 12A-12D, a change in optical properties is shown following a shockwave exposure with peak overpressure of 228 psi (1.57 MPa). FIGS. 12A and 12B show the baseline material prior to exposure. The material is fluorescent orange and yellow. FIGS. 12C and 12D show the material upon exposure to a blast with peak overpressure of 228 psi. FIG. 12C shows a bright yellow ring around a fluorescent red/orange center. FIG. 12D shows a muted blue/grey material. As is evident, following shockwave exposure at peak overpressure of 228 psi, an embodiment of the blast injury dosimeter exhibited dramatic colorimetric changes, which, for example, consisted of red/orange hues changing to yellow or blue hues.

Figure 13:
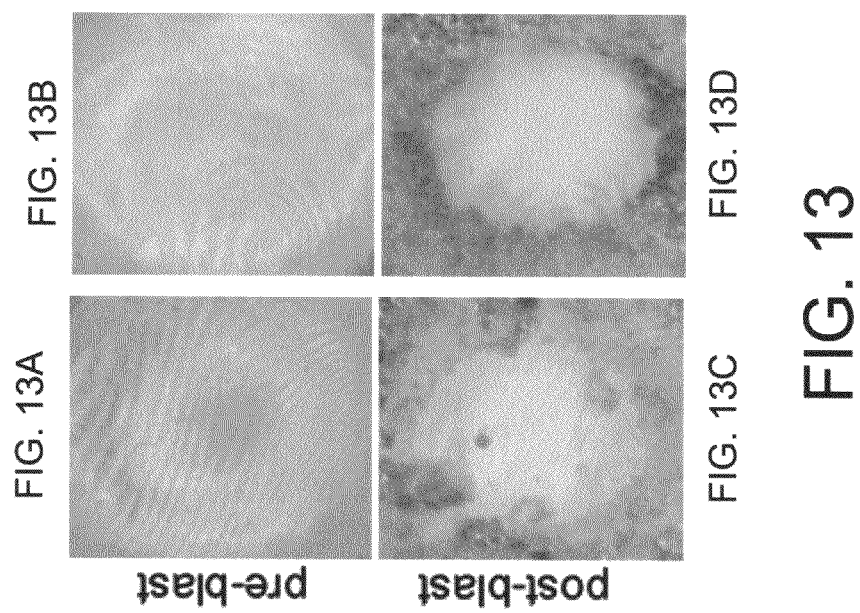
FIGS. 13A-13D are images of a photonic crystal material used in embodiments of the present invention illustrating pre- and post-shockwave exposure with peak overpressure of 345 and 766 psi, respectively.

Referring to FIGS. 13A-13D, a change in optical properties is shown following a shockwave exposure with peak overpressure of 345 psi (2.38 MPa) and 766 psi (5.28 MPa), respectively. FIGS. 13A and 13B show the baseline material prior to exposure. FIGS. 13A and 13B show a fluorescent green/yellow material with grey spots in the center and at the corners. FIG. 13C shows the material upon exposure to a blast with peak overpressure of 345 psi, and FIG. 13D shows the material upon exposure to a blast with peak overpressure of 766 psi. FIG. 13C shows a pink/orange center surrounded by a muted grey at the corners. FIG. 13D shows a grey/beige center and a darker grey around the edges. As is evident, following these higher intensity blast shockwave exposures at peak overpressures of 345-766 psi, there were overt colorimetric changes in an embodiment of the blast injury dosimeter, showing some or complete color loss. Thus, embodiments of the blast injury dosimeter demonstrate the ability to respond to a shockwave by altering structural properties at the nano-scale, creating color changes at the macro-scale. Importantly, these changes in optical characteristics and ultrastructure occurred as a function of exposure to a blast pressure wave. Thus, the physical properties may be tuned to provide dose-dependent responses.

While embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A method for evaluating traumatic brain injury probability based on detected blast induced pressure changes comprising:
    (a) exposing a material having a first optical property, to a pressure wave having a blast level to permanently alter and destroy at least a portion of the material;
    (b) detecting blast induced pressure changes by determining a change in the first optical property to a second optical property of the exposed material, wherein the extent of change corresponds to the blast level; and
    (c) evaluating a probability of traumatic brain injury according to a relationship between the second optical property and the blast level.

2. The method of claim 1, wherein step (b) includes visibly observing the second optical property.

3. The method of claim 1, wherein the change in the first optical property to the second optical property corresponds to a change in color of the material.

4. The method of claim 1, wherein the change in the first optical property to the second optical property occurs in response to a cumulative sum of blast levels from a plurality of blasts.

5. The method of claim 1, wherein the material is incorporated into a patch wearable on clothing.

6. A method for detecting blast induced pressure changes comprising:
    (a) exposing a photonic crystal material, having a lattice structure and a first optical property comprising a first color profile, to a pressure wave having a blast level to destroy at least a portion of the lattice structure; and
    (b) detecting blast induced pressure changes by determining a change in the first optical property to a second optical property comprising a second color profile of the exposed photonic crystal material, wherein the extent of change in color corresponds to the blast level,
    wherein at least a portion of the lattice structure is destroyed by at least one of destroying at least a portion of an arrangement of apertures in the lattice structure or destroying one or more layers of the lattice structure.

7. The method of claim 6, wherein the lattice structure comprises interconnected posts and struts which provide a plurality of layers.

8. The method of claim 6, wherein step (b) includes visibly observing the second optical property.

9. The method of claim 6, wherein the change in the first optical property to the second optical property corresponds to a change in color of the material.

10. The method of claim 6, wherein step (b) comprises observing the change in the first optical property to the second optical property relative to a viewing angle that is substantially perpendicular to a surface of the material.

11. The method of claim 6, wherein the material has a blast level threshold and the change in the first optical property to the second optical property occurs when the blast level of the pressure wave is greater than the blast level threshold.

12. The method of claim 11, wherein the change in the first optical property to the second optical property occurs in response to a single blast greater than the blast level threshold.

13. The method of claim 11, wherein the change in the first optical property to the second optical property occurs in response to a cumulative sum of blast levels from a plurality of blasts, wherein the sum is greater than the blast level threshold.

14. The method of claim 6, wherein the photonic crystal material comprises a polymer.

15. The method of claim 14, wherein the polymer is selected from the group consisting of a glycidyl ether derivative of bisphenol-A-novolac resin, a methacrylate, an acrylate, a polystyrene, a polyimide, a polyurethane, and a silicone.

16. The method of claim 6 further comprising, prior to step (a), forming the material by a multi-beam interference lithography process such that the material has the first optical property.

17. The method of claim 16, wherein the material is formed from a negative-tone photoresist.

18. The method of claim 16, wherein the first optical property is a function of at least one of a dielectric constant of the material, a symmetry of the lattice structure, and a porosity of the material.

19. A method for detecting blast induced pressure changes comprising:
(a) forming a photonic crystal material from a polymer such that the photonic crystal material has a first optical property comprising a first color profile, the photonic crystal having a lattice structure with an arrangement of apertures;
(b) destroying at least a portion of the lattice structure of the material by a pressure wave having a blast level; and
(c) subsequent to step (b), detecting blast induced pressure changes by determining a change in the first optical property to a second optical property, comprising a second color profile, of the material, wherein the extent of the change in color corresponds to the blast level.

20. A method for detecting blast induced pressure changes comprising:
(a) exposing a photonic crystal material having a lattice structure to a pressure wave having a blast level to destroy at least a portion of the lattice structure;
(b) transmitting, after step (a), light onto the photonic crystal material;
(c) receiving light reflected from the material; and
(d) detecting blast induced pressure changes by measuring an optical property of the photonic crystal material with a measurement device, the optical property selected from the group consisting of a reflected wavelength of light, a luminance, and a radiance.

21. The method of claim 20 further comprising (e) determining the blast level based on a relationship between the measured optical property of the material and blast level values.

22. The method of 20 further comprising, prior to step (a), measuring a first optical property of the photonic crystal material prior to exposing the photonic crystal material to the pressure wave; and comparing the first optical property to the measured optical property in step (d).

23. A method for detecting blast induced pressure changes comprising:
(a) exposing a contained solution having a first optical property, to a pressure wave having a blast level to permanently alter the solution; and
(b) detecting blast induced pressure changes by determining a change in the first optical property to a second optical property of the exposed solution, wherein the extent of change corresponds to the blast level.

24. A method for detecting blast induced pressure changes comprising:
(a) exposing a membrane-bound solution, where a colorimetric optical property of that solution is obscured, to a pressure wave having a blast level to permanently rupture the membrane and reveal the colorimetric optical property; and
(b) detecting blast induced pressure changes by determining the revealed colorimetric optical property of the exposed solution, wherein the colorimetric optical property corresponds to the blast level.

* * * * *